(12) United States Patent
Rosenberg

(10) Patent No.: US 6,761,050 B2
(45) Date of Patent: Jul. 13, 2004

(54) KINGPIN LOCKING DEVICE

(75) Inventor: Avron S. Rosenberg, Golden Valley, MN (US)

(73) Assignee: Cargo Protectors, Inc., Minneapolis, MN (US)

( * ) Notice: Subject to any disclaimer, the term of this patent is extended or adjusted under 35 U.S.C. 154(b) by 0 days.

(21) Appl. No.: 10/288,053

(22) Filed: Nov. 5, 2002

(65) Prior Publication Data

US 2004/0083776 A1 May 6, 2004

(51) Int. Cl.$^7$ ................................................ E05B 73/00
(52) U.S. Cl. ............................ 70/14; 70/232; 280/507
(58) Field of Search .................. 70/14, 54–56, 70/58, 232, 258; 280/507, 511

(56) References Cited

U.S. PATENT DOCUMENTS

| | | | | |
|---|---|---|---|---|
| 2,630,698 A | * | 3/1953 | Morrow | 70/232 |
| 2,630,699 A | * | 3/1953 | Langdon | 70/232 |
| 2,641,124 A | * | 6/1953 | Gallagher et al. | 70/232 |
| 3,763,675 A | * | 10/1973 | Hofmeister et al. | 70/232 |
| 3,798,938 A | * | 3/1974 | McCullum | 70/232 X |
| 3,832,872 A | * | 9/1974 | Gerlach | 70/232 |
| 3,922,897 A | * | 12/1975 | Mickelson | 70/232 |
| 4,141,233 A | * | 2/1979 | Reyes | 70/232 |
| 4,553,415 A | * | 11/1985 | Maffey | 70/232 |
| 4,620,718 A | * | 11/1986 | Mickelson | 280/507 |
| 4,697,444 A | * | 10/1987 | Maffey | 70/232 |
| 5,052,203 A | * | 10/1991 | Van Cuyk | 70/232 |
| 5,136,863 A | * | 8/1992 | Richardson | 70/14 |
| 5,297,407 A | * | 3/1994 | Tarr | 70/232 |
| 5,351,511 A | * | 10/1994 | Bernier | 70/232 |
| 5,491,992 A | * | 2/1996 | Mandall | 70/232 |
| 5,987,938 A | | 11/1999 | Frei | 70/14 |
| 6,161,402 A | * | 12/2000 | Moore | 70/14 |
| 6,202,453 B1 | * | 3/2001 | Disher et al. | 70/14 |
| 6,412,313 B1 | * | 7/2002 | Bernstrom | 70/14 |
| 6,427,496 B1 | * | 8/2002 | Hurst | 70/14 |

OTHER PUBLICATIONS

Cargo Protectors, Inc., Cargo Protector King Pin Lock, Brochure.

* cited by examiner

Primary Examiner—Suzanne Dino Barrett
(74) Attorney, Agent, or Firm—Patterson, Thuente, Skaar & Christensen, P.A.

(57) ABSTRACT

A kingpin lock device generally including a lock housing, a selectively engageable lock, and a sliding member. The lock housing can include a kingpin receiving aperture, a lock receiving channel, and a sliding channel. The sliding member can include a concave portion at one end for engaging the surface of the kingpin, a slot portion intermediate the sliding member for receiving the selectively engageable lock, and a stop lip/flange portion at the end distal the curved portion. The stop flange portion includes at least one lip for engaging the outer surface of the lock housing upon positioning of the sliding member within the sliding channel. As such, movement of the sliding member within the sliding channel is limited and the introduction of a substantial longitudinal force on the sliding member will not bring the lock into damaging forceable contact with the slot portion of the sliding member.

11 Claims, 3 Drawing Sheets

KINGPIN LOCKING DEVICE

FIELD OF THE INVENTION

The present invention relates generally to security devices implemented in the trucking industry and, more particularly, to a kingpin locking device having a stoppable sliding member to provide protection to components when influenced by force from theft or abuse.

BACKGROUND OF THE INVENTION

Conventional kingpin locks are typically designed with a receiving aperture or wrap-around device that permits lockable engagement with a trailer kingpin to discourage or even prevent theft of trailers and their contents. With the trailer kingpin surrounded by the device, a thief is without means of attaching the trailer to a secondary vehicle. As such, various designs and techniques have been implemented with kingpin locks in an attempt to promote this theft prevention goal. However, conventional systems present innate drawbacks.

First, many conventional devices are unnecessarily complex. Namely, it is common for lock designs to employ complicated and proprietary components. For instance, integrated locks and latching systems are often utilized wherein the interplay of the components is inflexible. These conventional designs introduce undesirable manufacturing and repair costs. The occurrence of part malfunctions increases, and ease of interchangeability is impractical. As such, consumer appeal is negatively affected such that these conventional features bring down public interest in the products.

Second, many of the devices that implement these complicated and/or intricate systems, often fail to consider the urgency of a theft scenario. A thief is not generally interested in consuming valuable time analyzing a system. Instead, thieves are likely to employ force in an attempt to break the locks. Since many conventional and often-complex locks include components undesirably exposed outside the kingpin lock housing, vulnerability is relatively high. Integrated locks, sliding bars, and similar components that are accessible outside the lock housing can be subjected to substantial force with tools such as sledge hammers to initiate breakage.

Even advanced designs that have addressed the problems with these conventional lock systems leave room for improvement. For instance, U.S. Pat. No. 4,620,718, incorporated herein by reference, comprises a kingpin lock device having a system of locking the trailer kingpin that employs a simple design, with some standard components, wherein the vast majority of the components are protected within the lock housing. Namely, a standard padlock is fully insertable within the housing to latchably engage a portion of a sliding member such that the engagement of the padlock to the sliding member restricts movement of the housing away from or off of the trailer kingpin. With a minimum level of component exposure, forceable damage to the lock is substantially avoided. However, while the '718 Patent is a significant improvement over conventional kingpin lock designs, the design can be improved to further advance the goal of theft prevention. As the sliding member must be selectively slidable in and out of the sliding chamber of the lock housing, it is equipped with a handle groove at one end that must be externally accessible for adjustment of the sliding member once the lock has been disengaged. As such, it is possible for the sliding member to be forced inward into contact with the engaged lock such that damage can occur to the lock and/or the sliding member. With an extremely high level of force, it is possible to break either of the components to obtain disengagement of the kingpin lock from the trailer kingpin.

As a result, there is a need for a kingpin lock device that will substantially solve the problems plaguing conventional designs and techniques. Namely, complex and proprietary designs must be avoided while still furthering the goal of theft prevention. All of this must be accomplished with a device that does not impose burdensome manufacturing costs and user inconvenience.

SUMMARY OF THE INVENTION

The lockable kingpin system of the present invention substantially solves the problems with conventional devices. Namely, a device of simple design is presented that does not require expensive manufacturing materials and components, while still promoting theft prevention with component designs that are not vulnerable to damage from externally exerted forces.

The kingpin lock device of the present invention generally includes a lock housing, a selectively engageable lock, and a sliding member. The lock housing can include a kingpin receiving aperture, a lock receiving channel, and a sliding channel. The sliding member can include a concave portion at one end for engaging the surface of the kingpin, a slot portion intermediate the sliding member for receiving the selectively engageable lock, and a stop lip/flange portion at the end distal the curved portion. The stop flange portion includes at least one lip for engaging the outer surface of the lock housing upon positioning of the sliding member within the sliding channel. As such, movement of the sliding member within the sliding channel is limited and the introduction of a substantial longitudinal force on the sliding member will not bring the lock into damaging forceable contact with the slot portion of the sliding member. Despite force from a tool such as a sledgehammer, the sliding member will not enter into the sliding channel beyond the predetermined distance defined by the location of the stop flange portion. The flange can take on a myriad of shapes and sizes.

DETAILED DESCRIPTION OF THE INVENTION

Figure 1:
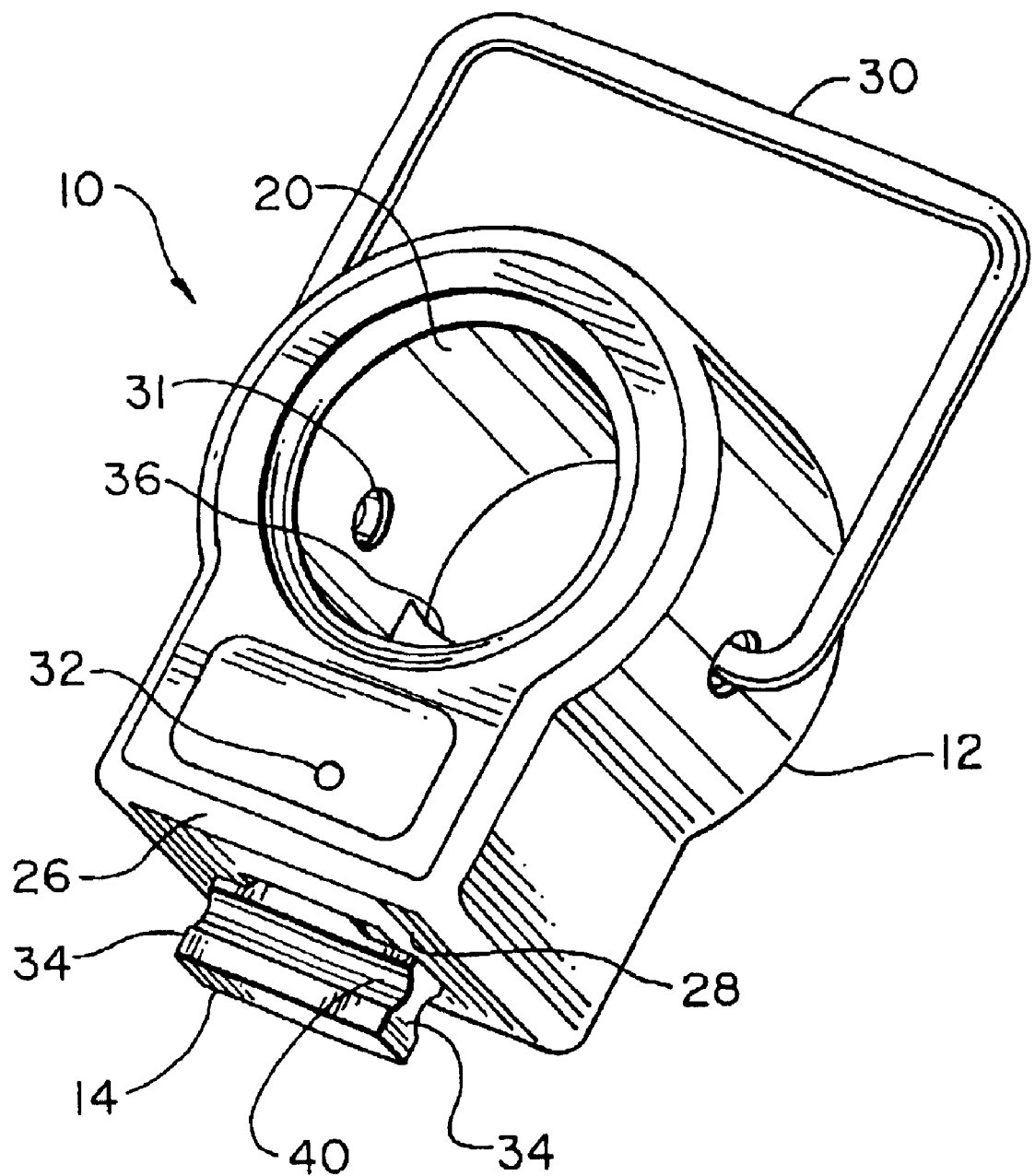
FIG. 1 is a perspective view of a kingpin lock device in accordance with an embodiment of the present invention.

Referring to FIGS. 1–4, a kingpin lock device 10 in accordance with the present invention is generally shown. The lock device 10 generally includes a lock housing 12, a sliding member 14, and a selectively latchable lock 16. Further, the device 10 is selectively lockably engageable with a kingpin 18, such as those commonly known for employment on tractors or trailers.

Figure 2:
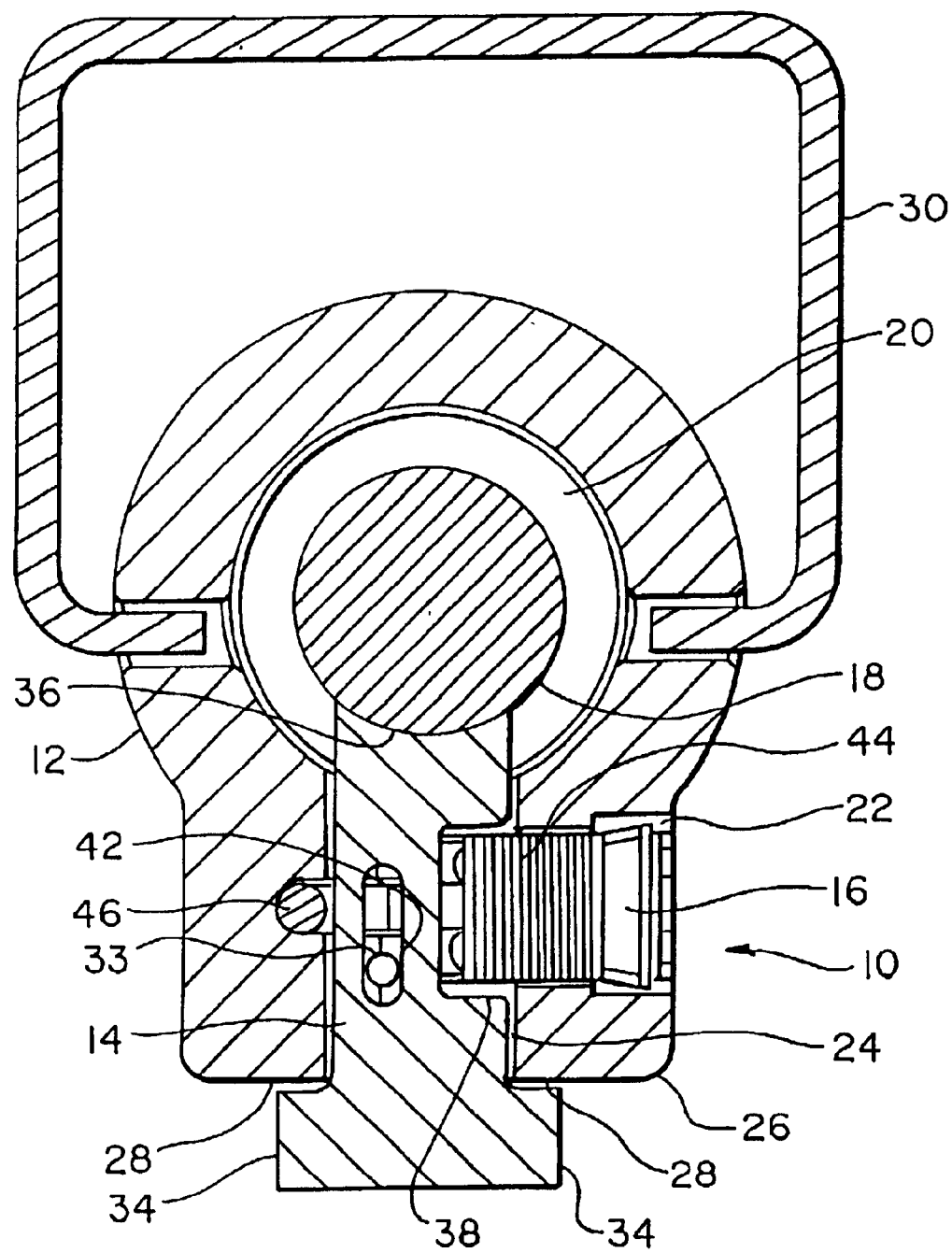
FIG. 2 is a top cross-section view of an embodiment of a kingpin lock device engaging a kingpin in accordance with the present invention.

Referring primarily to FIGS. 1–2, the lock housing 12 can include a kingpin receiving aperture 20, a lock receiving channel 22, a sliding member channel 24, and a front portion 26. The front portion 26 generally includes a stop surface 28. The lock housing 12 is generally constructed of a durable steel, iron, or aluminum, but it is envisioned that other durable materials designed to accommodate the environmental and strength requirements of a kingpin lock can also be employed. The receiving aperture 20 is shaped and sized to receive the kingpin 18 such that kingpins of various sizes can pass into and through the housing 12 with a measurable amount of extra room left between the outside surface of the kingpin 18 and the inner diameter of the generally cylindrical-shaped receiving aperture 20, as shown in FIG. 2. The lock receiving channel 22 is in fluid communication and generally transverse to the longitudinal axis of the kingpin receiving aperture 20. The lock receiving channel is sized and shaped to fully accept various latchable locks 16 to substantially shroud the locks 16. The sliding member channel 24 is also generally transverse to the longitudinal axis of the kingpin receiving aperture 20. The sliding member channel 24 provides a channel of fluid communication through the front portion 26 of the housing into the cylindrical cavity of the kingpin receiving aperture 20. As such, each of said apertures and channels 20–24 are in fluid communication with each other to create an area of connectability within the lock housing 12.

Further, the lock housing 12 can include a pin aperture 32 substantially parallel with the longitudinal axis of the kingpin receiving aperture 20 such that the pin aperture 32 provides a chamber that preferably does not completely pass through the housing 12. As a result, a roll pin 33, an expand pin, or the like can be inserted through the pin aperture 32 to securely rest at a stop position, as shown in FIG. 2. At this stop position the roll pin 33 can be forceably engaged using various known tools to removably lockably engage the pin 33. As further discussed herein, the pin 33, in the forceably engaged stop position, will provide a displacement restriction on an engaged sliding member 14 through the sliding member channel 24. In various embodiments, a handle 30 can be included which is attached to the housing 12 at handle bores 31 defined through the housing 12 to promote and facilitate device 10 portability.

Figure 3:
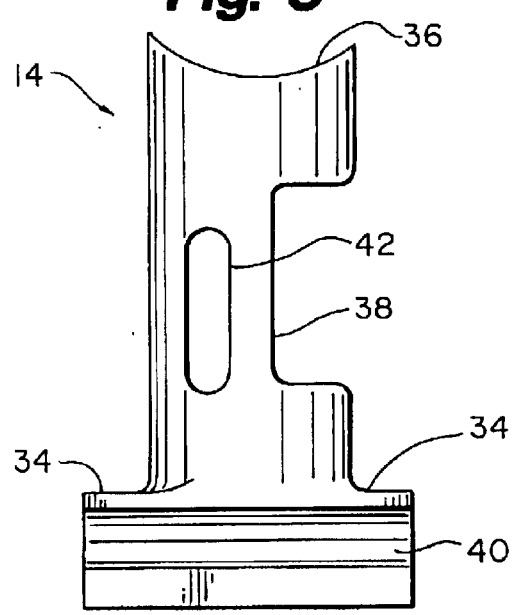
FIG. 3 is a top view of an embodiment of a sliding member for use with a kingpin lock device in accordance with the present invention.
Figure 4:
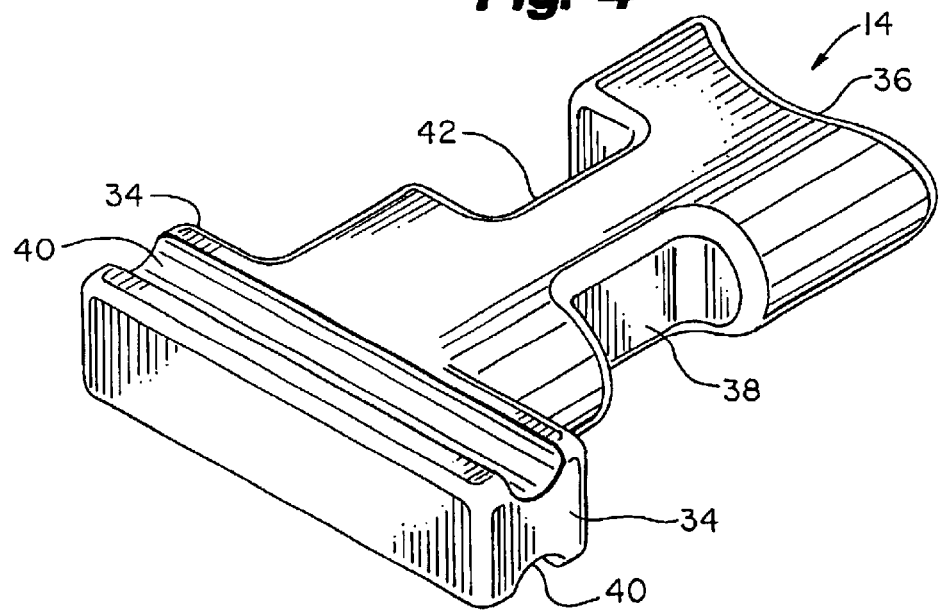
FIG. 4 is a perspective view of an embodiment of a sliding member for use with a kingpin lock device in accordance with the present invention.

Referring primarily to FIGS. 3–4, embodiments of the sliding member 14 generally includes a stop flange portion 34, a concave end portion 36, a slot portion 38, a handle portion 40, and a pin guide 42. The stop flange 34 is at an end of the member 14 distal the concave end portion 36 and defines a portion of the member 14 measurably larger than the width of the sliding member channel 24. Flanges 34 of varying shapes and sizes can be employed as well without deviating from the spirit and scope of the present invention. For instance, alternative embodiments can include a flange 34 design wherein the lip of the flange extends along a plane parallel to the receiving aperture 20, is transverse to the longitudinal length of the sliding member; 14, includes arcuate flanges 34, or incorporates a myriad of other variations.

The slot portion 38 comprises a groove or cut out of a predefined distance along one side of the member 14, wherein the slot portion 38 is substantially intermediate the stop flange portion 34 and the concave end portion 36. In addition, a handle portion 40 can be included proximate the stop flange portion 34 to facilitate user manipulation of the sliding member 14, as best seen in FIGS. 1 and 4. Generally, the handle portion 40 will include. grooves within the sliding member 14 to create a surface contour change for ease-of-handling.

To prevent inadvertent loss of the sliding member 14, and to ensure that the displacement of the sliding member 14 within the sliding member channel 24 is limited, a displacement system is employed. In one embodiment, the displacement system includes the pin 33 which will preferably pass through the pin aperture 32 of the housing 12 and through the pin guide 42 of the sliding member 14. As such, displacement of the sliding member 14 when the pin 33 is engaged in the stop position will be limited to the abuttable contact of the pin 33 within and along the corresponding length of the pin guide 42. Other known means of limiting such displacement can also be employed without deviating from the spirit and scope of the present invention. In alternative embodiments, the pin guide 42 will be located at an edge opposite the slot 38, as shown in FIG. 4. With such embodiments, the pin guide 42 will limit displacement of the sliding member 14, but will do so without employing a pass-through slot central the member 14. Further, alternative embodiments of the pin guide 42 can simply include a groove or recess, along a portion of the sliding member 14 that does not completely pass through the sliding member 14. Regardless, and unlike the conventional practice of utilizing a set screw for limiting displacement, the pin 33 and pin guide 42 technique of the present invention makes it difficult to remove the displacement device either intentionally or accidentally. It is difficult for thieves to force out the roll pin 33 from its stop position. Further, travel, storage, and every day use will not result in undesirable loosening of a displacement device such as the conventional set screw.

As shown in FIG. 2, the latchable lock 16 can include a body 44, a shackle 46, and a key (not shown). The key can be used to selectively engage and disengage the shackle from the lock body 44. Various latchable locks known to one skilled in the art can be implemented with the present invention. When originally configuring or manufacturing the device of the present invention 10, the sliding member 14 is inserted into the sliding member channel 24 and the pin aperture 32 is aligned to match up with a portion of the pin guide 42. As such, the pin 33 can be forceably engaged within the pin aperture 32, through or to the pin guide 42, to create stop positions along the longitudinal travel path of the sliding member 14 within the sliding channel 24. This fundamental configuration technique will generally exist and remain despite the selective implementation of various locks, or the selective connection of the device 10 to a myriad of trailers and respective kingpins 18. With movement of the sliding member 14 being controlled within the channel 24, the slot portion 38 is generally aligned with the lock receiving channel 22 for ease of operation. To house a particular lock within the kingpin lock housing 12, the sliding member 14 is removed or pulled back within the channel 24 prior to inserting the pin 33, or after removing the pin 33, such that the shackle 46 of the lock 16 can be positioned within the lock receiving channel 22. Once positioned, the sliding member 14 can be slidable adjusted to pass through the loop of the shackle 46. Again, following this insertion and adjustment of a defined lock 16 within the lock receiving channel 22, the pin 33 limits the travel path defined by the pin guide 42 configuration.

At engagement, the shackle 46 of the lock 16 selectively engulfs or surrounds the slot portion 38 of the sliding member 14. With the lock 16 abuttably and lockably surrounding the slot portion 38, the sliding member 14 is yet further limited in its movement within the sliding member channel 24. By unlocking the shackle 46 of the lock 16, the lock body 44 can be withdrawn a distance back from the proximate slot portion 38 to again increase moveability of the sliding member 14.

In operation, a kingpin lock device 10 in accordance with the present invention is selectively engageable with a standard kingpin 18. Typical standard kingpins 18 are of a common shape and size and can include an annular groove. To secure these kingpins 18 from unwanted tampering or unauthorized connectivity, the user will unlock the latchable lock 16 (i.e., a padlock) with the key. The lock body 44 may then be partially withdrawn from the lock receiving channel 22, and its position against the slot portion 38. However, as stated herein, uninhibited movement of the sliding member 14 is limited in this state by the engaged roll pin 33.

When the lock 16 is partially engaged with the slot portion 38, permissible movement of the sliding member 14 along the defined path of pin guide 42 enables the user to adjust engagement of the concave end portion 36 with the circumferential surface of the kingpin 18. The annular groove portion can provide longitudinal limits on movement of the kingpin 18 from engagement with the abutted concave portion 36 of the sliding member 14. When the sliding member 14 is measurably withdrawn, the concave end 36 is drawn at least partially out of the kingpin receiving aperture 20, thus permitting the trailer kingpin 18 to pass through. After the lock housing 12 is placed over the trailer kingpin 18, the concave end 36 may be pushed into contact engagement with the surface of the kingpin 18, or into the annular groove. The lock body 44 can then be pushed into lockable engagement with the corresponding shackle 46 within the slot portion 38 to substantially prevent movement of the member 14 relative to the lock housing 12 and its sliding member channel 24.

With conventional techniques, engaged kingpin locks are still vulnerable to tampering caused by excessive force from a tool such as a sledgehammer. With the present invention, a blow following the longitudinal axis of the sliding member 14 will meet at least two levels of resistance to substantially assist in maintaining the integrity of the lock device 10 and its position on the engaged kingpin 18. First, the longitudinal movement of the sliding member 14 is limited by the inevitable abutment of the stop flange portion 34 against the stop surface 28 of the lock housing 12. In addition, the restricted movement of the member 14 caused by the path defined by the roll pin 33 within pin guide 42 is also beneficial. It should be noted that the implementation of the roll pin 33 and pin guide 42 system without the flange stop 34 would leave the latchable lock 16 vulnerable to forceable contact with the sliding member 14 and the roll pin 33 itself.

Those skilled in the art will appreciate that other embodiments in addition to the ones described herein are indicated to be within the scope and breadth of the present application. Accordingly, the applicant intends to be limited only by the claims appended hereto.

What is claimed is:

1. A kingpin locking device comprising:
   a housing having a receiving aperture for receiving a kingpin, a pin aperture, and a sliding member channel, the sliding member channel generally transverse to the pin aperture;
   a latchable lock insertable into the housing, the latchable lock having a shackle portion; and
   a sliding member having a first longitudinal edge and a second longitudinal edge, the second longitudinal edge generally opposite the first longitudinal edge, the sliding member separate from the latchable lock for slidable movement within the housing, the sliding member comprising:
      a slot portion defined by the first longitudinal edge of the sliding member, the slot portion shaped and positionable to receive the insertable lock;
      a pin guide defined by the second longitudinal edge of the sliding member and generally alignable with the pin aperture; and
      an end portion having a handle and a flange, the flange laterally extending beyond the first and second longitudinal edges and sized to abutably prevent the end portion from entering the housing upon receiving longitudinal force on the sliding member, thereby preventing damaging contact between the sliding member and the insertable lock within the housing.

2. The device of claim 1, wherein the pin guide limits displacement of the sliding member.

3. The device of claim 2, wherein the pin aperture is substantially parallel to the longitudinal axis of the receiving aperture.

4. The device of claim 1, further comprising a pin, the pin being insertable past the pin guide such that removable securement of the pin within the pin aperture limits displacement of the sliding member along the pin guide.

5. The device of claim 1, the sliding member further including a concave end portion at an end distal to the flange end portion, wherein the concave end portion is abuttably engageable against the outer surface of the kingpin to limit displacement of the lock housing from around the received kingpin.

6. A method of selectively lockably engaging a kingpin lock to a kingpin, the method comprising:
   alignably shrouding a substantially cylindrical surface of the kingpin within a kingpin receiving aperture of a kingpin lock housing;
   sliding a sliding member having a flanged end portion within a sliding channel of the kingpin lock housing, the flanged end portion extending beyond generally opposed first and second longitudinal edges of the sliding member;
   slidably engaging the sliding member against the substantially cylindrical surface of the kingpin such that a concave end portion of the sliding member abuttably engages the cylindrical surface, with sliding of the sliding member within the lock housing being limited by abutment of the flanged end portion of the sliding member against the outer surface of the lock housing such that the flanged end portion is maintained external to the housing and not recessed therein;
   selectively locking a shackle portion of a latchable lock separate from the sliding member around the sliding member within the housing to limit disengagement of the concave end portion of the sliding member from the cylindrical surface of the kingpin; and
   securing a pin through a pin aperture in the lock housing, the pin aperture being generally transverse to the sliding member, such that the pin extends past a pin guide defined by the sliding member second longitudinal edge, thereby limiting movement of the sliding member within the sliding channel.

7. A kingpin locking device comprising:
   a main housing having:
      a kingpin receiving aperture capable of accepting a kingpin therethrough;
      a sliding channel transverse to and in fluid communication with the longitudinal axis of the receiving aperture;
      a lock receiving channel in fluid communication with the sliding channel;
      a pin aperture generally transverse to the sliding channel;

a sliding member slidable within the sliding channel of the main housing, the sliding member having opposed first and second longitudinal edges and comprising:
- a concave end portion adapted to abuttably engage the kingpin;
- a stop flange portion distal to the concave end portion and extending laterally beyond the first and second longitudinal edges, the stop flange portion abuttably engageable against the outer surface of the main housing to limit the distance the sliding member can slidably traverse within the sliding channel such that the stop flange portion is abuttably maintained external to the lock housing and not recessed therein;
- a handle extending from the stop flange portion;
- a slot portion defined by said first longitudinal edge of the sliding member, the slot portion intermediate the stop flange portion and the curved engagement portion; and
- a pin guide defined by said second longitudinal edge of the sliding member; and a lock having a shackle portion and being separate from the sliding member, the lock insertable into the lock receiving channel and the shackle portion adapted to surroundingly engage the sliding member to selectively lockably secure the kingpin; wherein the stop flange portion is adapted to substantially limit damaging abutment between the sliding member and the lock.

8. The device of claim 7, wherein the pin guide is proximate the slot portion.

9. The device of claim 8, further including a pin removably securable within the pin aperture to limit movement of the sliding member within the sliding channel.

10. The device of claim 9, wherein the pin is insertable through the pin guide such that removable securement of the pin within the pin aperture limits displacement of the sliding member within the sliding channel to the length of the pin guide.

11. The device of claim 7, the sliding member further comprising a concave end portion at the end distal the stop flange portion, wherein the concave end portion is abuttably engageable against the outer surface of the kingpin to limit displacement of the accepted kingpin from kingpin receiving aperture.

* * * * *